United States Patent
Hayashi et al.

(10) Patent No.: US 8,121,015 B2
(45) Date of Patent: Feb. 21, 2012

(54) OPTICAL DISK DRIVE DEVICE AND METHOD

(75) Inventors: Yasuhiro Hayashi, Yokohama (JP);
Hiroshi Shimada, Kamakura (JP);
Susumu Hoshino, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 93 days.

(21) Appl. No.: 12/628,311

(22) Filed: Dec. 1, 2009

(65) Prior Publication Data
US 2010/0157780 A1 Jun. 24, 2010

(30) Foreign Application Priority Data
Dec. 24, 2008 (JP) .................................. 2008-327273

(51) Int. Cl.
G11B 7/00 (2006.01)
(52) U.S. Cl. .............. 369/124.14; 369/47.28; 369/53.19
(58) Field of Classification Search .............. 369/124.14
See application file for complete search history.

(56) References Cited

U.S. PATENT DOCUMENTS
5,784,356 A 7/1998 Hayashi et al.
2008/0037393 A1* 2/2008 Kawabe et al. ............. 369/47.17

FOREIGN PATENT DOCUMENTS
JP 2006-351063 12/2006

* cited by examiner

Primary Examiner — Jorge L Ortiz Criado
(74) Attorney, Agent, or Firm — Turocy & Watson, LLP (57) ABSTRACT

An optical disk drive device has an RF equalizer configured to generate an equalized RF signal by controlling a frequency characteristic of a delay time of an RF signal read out from an optical disk based on a control input signal, a playback clock extractor configured to extract a playback clock for reproducing data recorded on the optical disk from the equalized RF signal, and an RF rate controller configured to generate the control input signal inputted to the RF equalizer, wherein the control input signal is a signal for correcting waveform distortion of the RF signal by controlling the delay time of the RF signal dependent on a frequency of the playback clock.

20 Claims, 9 Drawing Sheets

OPTICAL DISK DRIVE DEVICE AND METHOD

CROSS REFERENCE TO RELATED APPLICATIONS

This application is based upon and claims the benefit of priority from the prior Japanese Patent Applications No. 2008-327273, filed on Dec. 24, 2008, the entire contents of which are incorporated herein by reference.

BACKGROUND OF THE INVENTION

1. Field of the Invention

The present invention relates to an optical disc drive device and a method that reads out an RF (Radio Frequency) signal from an optical disk using an RF amplifier.

2. Related Art

Generally, a pickup or the like of an optical disk drive device has mechanical fluctuation. A recent optical disc drive device has a function to adjust a radial tilt (the shift of the point on an optical disk to which a laser beam is irradiated in the radial direction) when performing record and/or playback (reproduction) of the optical disk. However, a tangential tilt (the angle shift in the rotational direction of a position on the optical disk on which a laser beam is irradiated) is not adjusted physically and mechanically.

The tangential tilt may be a cause to distort playback data. Therefore, in order to avoid the influence of the tangential tilt, the waveform distortion of an RF signal must be corrected. If not corrected, it is necessary to design a pickup so as not to have the tangential tilt. Therefore, there is a problem that the margin of the pickup and/or pickup mechanism is small and the process yield gets worse.

JP-A No. 2006-351063 (Kokai) discloses a technique to detect the tangential tilt of the optical disk drive device. However, a technique to adjust the detected tangential tilt has never been described at all in the above publication.

In recent year, there has been increasing number of proposals of systems to secondarily adjust the tangential tilt by electric signal process. For example, one way is to introduce a PRML (Partial Response Maximum Likelihood) technique, which is generally used for HDD (Hard Disk Drive), to the optical disk drive device. However, for the PRML technique, large scale operation processing circuits such as a high speed A/D (Analog to Digital) converting circuit and a Viterbi decoding circuit are used. Therefore, a chip cost increases and consumption power also increases because the chip must operate with a high speed clock corresponding to a channel rate of input signals.

SUMMARY

According to one aspect of the present invention, an optical disk drive device comprising: an RF equalizer configured to generate an equalized RF signal by controlling a frequency characteristic of a delay time of an RF signal read out from an optical disk based on a control input signal; a playback clock extractor configured to extract a playback clock for reproducing data recorded on the optical disk from the equalized RF signal; and an RF rate controller configured to generate the control input signal inputted to the RF equalizer, wherein the control input signal is a signal for correcting waveform distortion of the RF signal by controlling the delay time of the RF signal dependent on a frequency of the playback clock.

According to the other aspect of the present invention, an optical disk drive method comprising: generating an equalized RF signal by controlling a frequency characteristic of a delay time of an RF signal read out from an optical disk based on a control input signal; extracting a playback clock for reproducing data recorded on the optical disk from the equalized RF signal; and generating the control input signal, wherein the control input signal is a signal for reducing waveform distortion included in the RF signal by controlling the delay time of the RF signal dependent on a frequency of the playback clock.

BRIEF DESCRIPTION OF THE DRAWINGS

FIG. 3 is a circuit diagram showing an example of an internal configuration of a filter 151-1 in the RF equalizer 15a.

DETAILED DESCRIPTION OF THE INVENTION

Hereinafter, the present embodiments will be explained with reference to accompanying drawings.

First Embodiment

Figure 1:
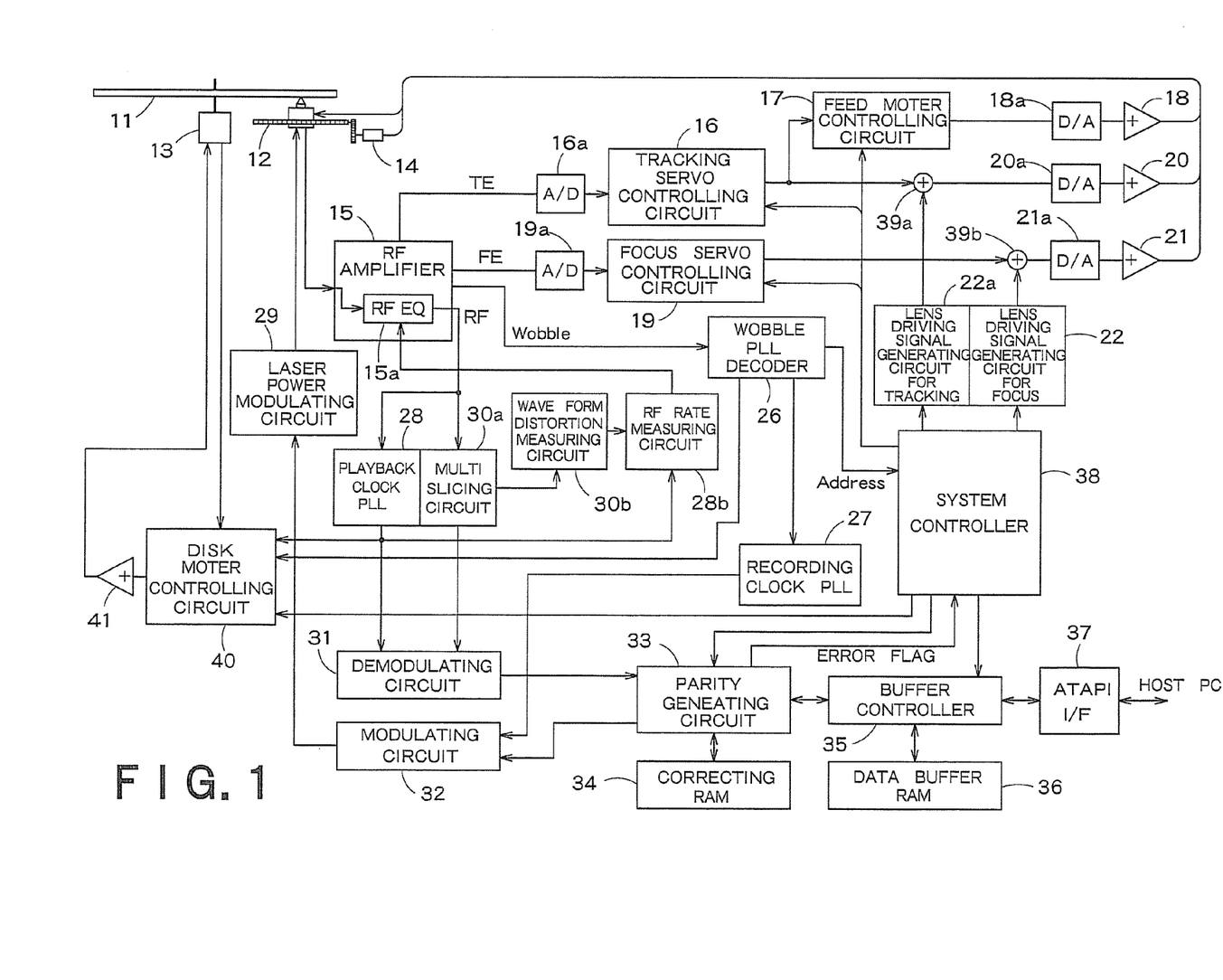
FIG. 1 is a block diagram showing a schematic configuration of an optical disk drive device according to a first embodiment of the present invention.

FIG. 1 is a block diagram showing a schematic configuration of an optical disk drive device according to a first embodiment of the present invention. The optical disk drive device of FIG. 1 has a pickup 12, an RF amplifier 15 having an RF equalizer 15a (RF EQ), an A/D-converting circuit 16a for TE (Tracking Error), a tracking servo controlling circuit 16, a lens driving signal generating circuit 22a for tracking, an adder 39a, a D/A (Digital to Analog) converting circuit 20a for tracking servo, a tracking actuator driver 20, a feed motor controlling circuit 17, a D/A-converting circuit for feed motor 18a, a feed motor driver 18, a feed motor 14, an A/D-converting circuit 19a for FE (Focus Error), a focus servo controlling circuit 19, a lens driving signal generating circuit 22 for focus, an adder 39b, a D/A-converting circuit 21a for focus servo, and a focus actuator driver 21.

The pickup 12 irradiates an optical disk 11 with a beam and detects a beam signal reflected on the optical disk 11 to provide its reflected beam signal to the RF amplifier 15. The RF amplifier 15 generates a tracking servo error signal for controlling the direction of the track, a focus servo signal for controlling the beam to focus on the recording surface of the optical disk 11, an RF signal functioning as an information signal and a Wobble signal, based on the reflected beam signal.

The A/D-converting circuit 16a for TE converts the tracking error signal to a digital signal to provide its digital signal to the tracking servo controlling circuit 16. The lens driving signal generating circuit 22a for tracking generates a lens driving signal for jumping in direction of the track on address seeking. This lens driving signal is added by the adder 39a to tracking servo data generated by the tracking servo controlling circuit 16 and is converted to an analog signal by the D/A-converting circuit 20a for tracking. The tracking actuator driver 20 drives a tracking actuator (not shown) of the pickup 12 based on the analog signal.

The feed motor controlling circuit 17 amplifies a low frequency component of the tracking servo data necessary to move the pickup 12 in the radial direction of the optical disk 11. The amplified data is converted to an analog signal by the D/A-converting circuit 18a for feed motor. The feed motor driver 18 drives the feed motor 14 based on the analog signal.

The D/A-converting circuit 19a for FE converts the focus error signal to a digital signal to provide its digital signal to the focus servo controlling circuit 19. The lens driving signal generating circuit 22 for focus generates a lens driving signal which is necessary to activate the focus servo. The lens driving signal is added by the adder 39b to focus servo data generated by the focus servo controlling circuit 19 and is converted to an analog signal by the D/A-converting circuit 21a for focus. The focus actuator driver 21 drives a focus actuator (not shown) of the pickup 12 based on the analog signal.

Furthermore, the optical disk driving device according to the present embodiment also has a Wobble PLL (Phase Locked Loop) decoder 26, a disk motor controlling circuit 40, a disk motor driver 41, a disk motor 13, a recording clock PLL 27, a modulating circuit 32, a laser power modulating circuit 29, a multi slicing circuit 30a, a waveform distortion measuring circuit 30b, an RF rate measuring and controlling circuit 28b (RF rate controller), a playback clock PLL 28 (playback clock extractor), a demodulating circuit 31, a data correcting and parity generating circuit 33 (error corrector), a correcting RAM 34, a buffer controller 35, a data buffer RAM 36, an ATAPI (Advanced Technology Attachment Packet Interface) interface 37, and a system controller 38 (coefficient controller).

Hereinafter, the reproducing operation will be explained. The playback clock PLL 28 extracts a bit clock (playback clock) from the RF signal. The disk motor controlling circuit 40 generates a control signal for controlling the disk motor 13 in synchronization with the playback clock. The disk motor driver 41 rotate the disk motor 13 based on the control signal. The multi slicing circuit 30a binarizes the RF signal. Furthermore, the multi slicing circuit 30a, the waveform distortion measuring circuit 30b and the RF rate measuring and controlling circuit 28b control the RF equalizer 15a to correct a waveform distortion of the RF signal, as is described below. The playback clock and the binarized RF signal are provided to the demodulating circuit 31. The demodulating circuit 31 generates demodulated data by separating a sync signal and conducting demodulation to provide its demodulated data to the data correcting and parity generating circuit 33. The data correcting and parity generating circuit 33 performs correcting process of the demodulated data using the correcting RAM 34 and provides the buffer controller 35 with the corrected data. The buffer controller 35 buffers the corrected data on the data buffer RAM 36 temporarily and transfers the data according to request from a host PC (not shown) to the host PC through the ATAPI interface 37. The system controller 38 acquires an error flag which the data correcting and parity generating circuit 33 generates when performing the correcting process and determines the quality of the data read out from the optical disk 11.

Hereinafter, the recording operation will be explained. The Wobble PLL decoder 26 generates a Wobble clock based on the Wobble signal. The disk motor controlling circuit 40 generates a control signal for controlling the disk motor 13 based on the Wobble clock. The disk motor driver 41 rotates the disk motor 13 based on the control signal. Furthermore, the Wobble PLL decoder 26 obtains address information indicative of the recording position from the Wobble signal. The system controller 38 determines the recording position based on the address information. The recording data sent from the host PC is stored in the data buffer RAM 36 from the buffer controller 35 through the ATAPI interface 37. The data correcting and parity generating circuit 33 adds parity data to the recording data. The modulating circuit 32 converts the recording data with the parity data to a stream signal using a modulating clock obtained by generating a multiple of the frequency of the Wobble clock by the recording clock PLL 27. The laser power modulating circuit 29 modulates the stream signal to a pulse signal and controls the pickup 12 to record the data.

Hereinafter, the correction of the waveform distortion of the RF signal, which is one of the characteristic features of the present embodiments, will be explained. In general, the RF signal contains signal components including not a single frequency but a plurality of channel frequencies. For example, the RF signal of CD (Compact Disk) contains signal components composed of a plurality of channel frequencies of 3T to 11T as fundamental frequencies, while the RF signal of DVD (Digital Versatile Disk) contains that of 3T to 14T, where T is a cycle of 1 channel bit. It is known that delay time of the RF signal varies dependent on the frequency on the transfer path if the tangential tilt occurs. In the present embodiments, the RF equalizer 15a is controlled so as to have a transfer characteristic opposite to that of the transfer path. Because of this, the RF equalizer 15a corrects the distorted waveform of the RF signal, thereby improving the quality of the RF signal.

Figure 2:
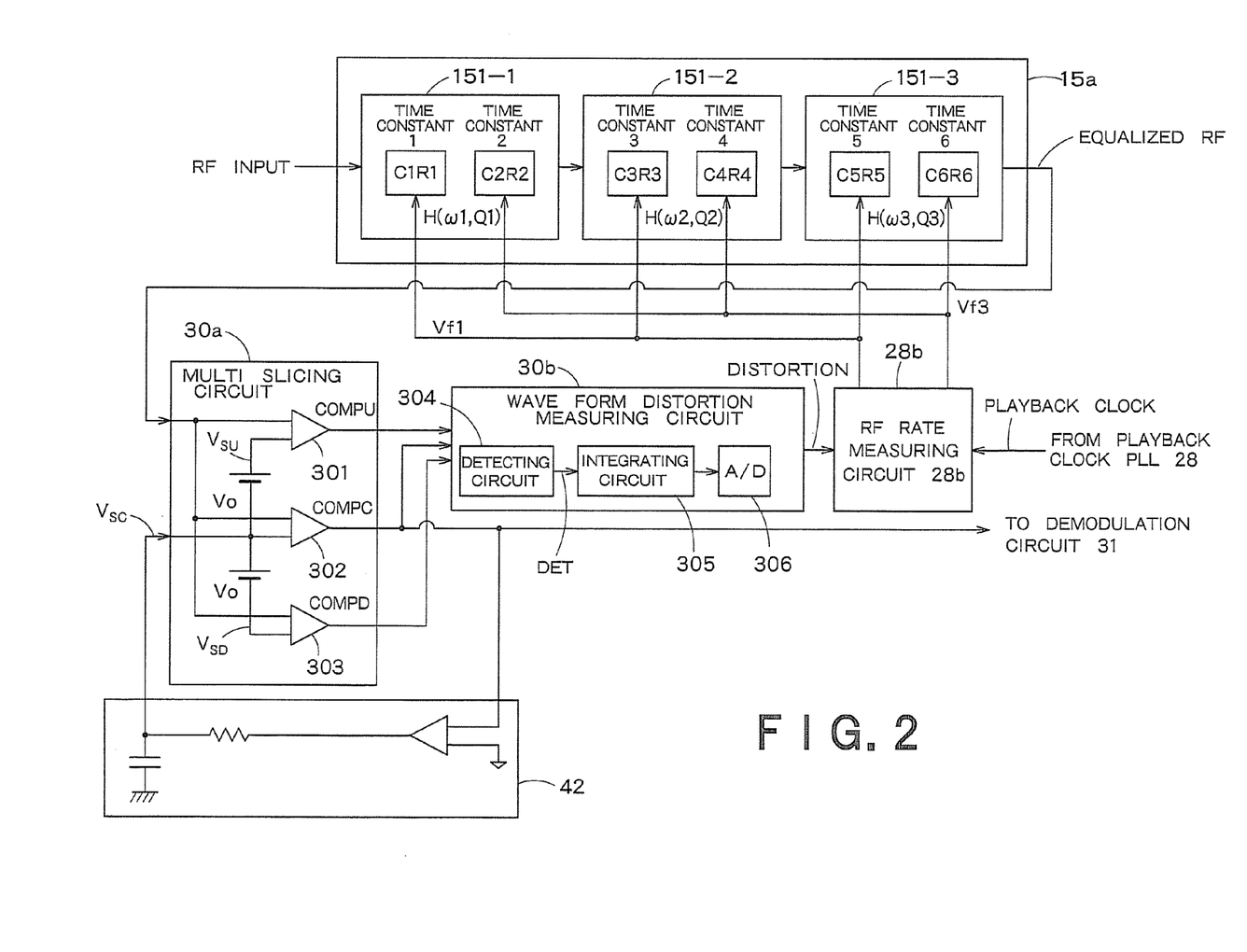
FIG. 2 is a block diagram showing an example of an internal configuration of an RF equalizer 15a, a multi slicing circuit 30a, a waveform distortion measuring circuit 30b, and an RF rate measuring and controlling circuit 28b.

FIG. 2 is a block diagram showing an example of an internal configuration of the RF equalizer 15a, the multi slicing circuit 30a, the waveform distortion measuring circuit 30b, and the RF rate measuring and controlling circuit 28b. At least a part of these may be integrated in a semiconductor chip. The chip may have other circuits such as the demodulating circuit 31.

The RF equalizer 15a has a plurality of filters 151-1, 151-2, 151-3 connected in series. The multi slicing circuit 30a has first to third comparators 301 to 303. Each of the comparators binarizes the RF signal with different slicing level. The waveform distortion measuring circuit 30b detects the waveform distortion of the RF signal based on the slicing result of the multi slicing circuit 30a. The RF rate measuring and controlling circuit 28b measures a frequency of the playback clock generated by the playback clock PLL 28 and controls a frequency characteristic of gain and phase (delay time) of the filters 151-1 to 151-3 in the RF equalizer 15a based on the frequency of the playback clock and the waveform distortion of the RF signal. As described above, the RF equalizer 15a corrects the waveform distortion of the RF signal dependent on the frequency of the playback clock.

The internal configuration and operation of the RF equalizer 15a of FIG. 2 will be explained firstly. The RF equalizer 15a of FIG. 2 is a sixth-order filter having second-order filters 151-1 to 151-3 connected in serial. Two kinds of time constants (ω and Q, as will be described below) of the filters 151-1 to 151-3 can be controlled by control input signals Vf1 and Vf3. In FIG. 2, the transfer functions of the filters 151-1 to 151-3 are H (ω1, Q1), H (ω2, Q2) and H (ω3, Q3), respectively.

One of the purpose of the RF equalize 15a is to delay the RF signal dependent on the frequency on the transfer characteristic opposite to that of the transmission path of the RF signal to correct the waveform distortion of the RF signal, which is described above. Other purpose is to amplify the amplitude of the high frequency component of the RF signal. This is because higher frequency components have smaller amplitudes. In the case of CAV (Constant Angular Velocity) rotation, as the pickup 12 moves outside of the optical disk 11, the frequency of the playback clock gets higher. Therefore, the frequency characteristic of the gain of the filters 151-1 to 151-3 must be shifted dependent on the frequency of the playback clock. Because the control of the characteristic of the gain of the filters 151-1 to 151-3 dependent on the frequency of the playback clock is conventionally performed, the detailed explanation is omitted. Hereinafter, the control of the frequency characteristic of the delay, time of the filters 151-1 to 151-3 will be explained in detail.

Figure 3:
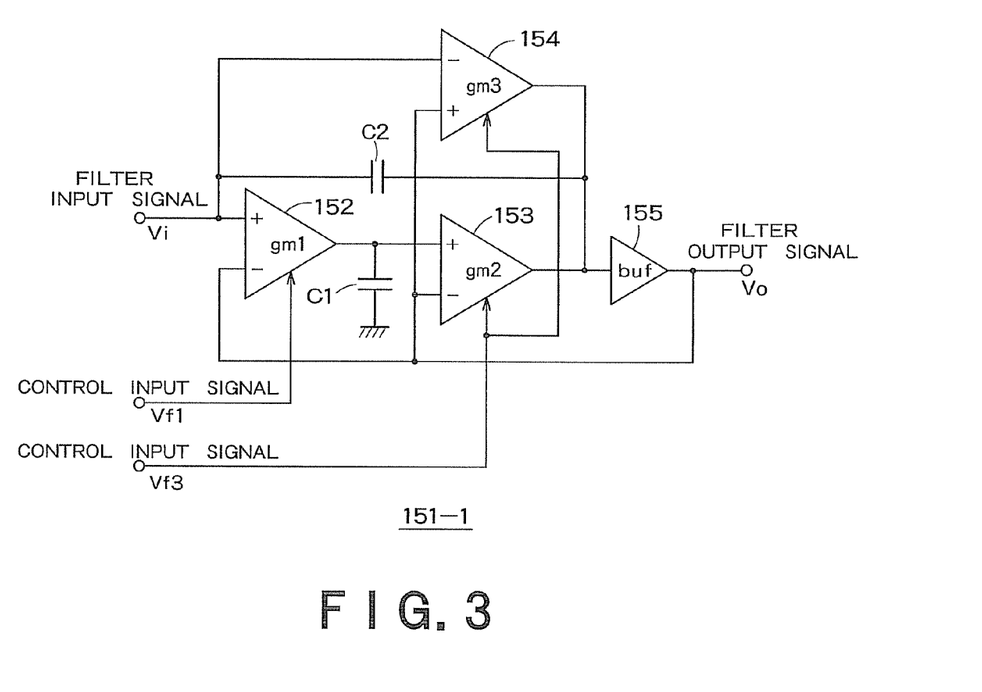

FIG. 3 is a circuit diagram showing an example of an internal configuration of the filter 151-1 in the RF equalizer 15a. Here, because the internal configurations of the filters 151-1 to 151-3 are the same, the internal configuration of the filter 151-1 is shown in FIG. 3 as a representative. The filter 151-1 has a first operation amplifier 152 (first differential amplifier), a second operation amplifier 153 (second differential amplifier), a third operation amplifier 154 (third differential amplifier), a capacitor C1 (first capacitor) a capacitor C2 (second capacitor), and a buffer 155.

An input signal vi of the filter 151-1 is inputted to the positive terminal of the first operation amplifier 152, an output signal vo is inputted to the negative terminal thereof, and the gain gm1 (first gain) thereof is controlled by the signal Vf1 (first control signal). An output signal of the first operation amplifier 152 (first signal) is inputted to the positive terminal of the second operation amplifier 153, the output signal vo is inputted to the negative terminal thereof, and the gain gm2 (second gain) thereof is controlled by the signal Vf3 (second control signal). The output signal vo is inputted to the positive terminal of the third operation amplifier 154, the input signal vi is inputted to the negative terminal thereof, the gain gm3 (third gain) thereof is controlled by the signal Vf3. The capacitor C1 is connected between the output terminal of the operation amplifier 152 and the ground terminal (reference voltage terminal). The capacitor C2 is connected between the input signal vi and the output terminal of the second operation amplifier 153 (here, the output signals terminals of the second and the third operation amplifiers 153 and 154 (second and third signal) are short-circuited). The output signal of the second operation amplifier 153 is inputted to the buffer 155, and the buffer 155 generates the output signal vo.

The signals Vf1 and Vf3 are provided by the RF rate measuring and controlling circuit 28b of FIG. 2. Furthermore, the operation amplifiers 152 to 154 are supplied with supply voltage (e.g. 2.5V), which is not shown in FIG. 3.

The transfer function H (ω1, Q1)=vo/vi of the filter 151-1 is expressed by following equation (1). Here, s=j2πf (f is the frequency).

$$\frac{vo}{vi} = \frac{1 - s\frac{gm3 \cdot C1}{gm1 \cdot gm2} + s^2\left(\frac{C1 \cdot C2}{gm1 \cdot gm2}\right)}{1 + s\frac{(gm2 - gm3) \cdot C1}{gm1 \cdot gm2} + s^2\left(\frac{C1 \cdot C2}{gm1 \cdot gm2}\right)} \quad (1)$$

Both of gm2 and gm3 are cooperatively controlled by signal Vf3. When the second and the third operation amplifiers 153 and 154 are designed so as to satisfy the relationship of gm2=2*gm3, the following equation (2) is satisfied.

$$\frac{vo}{vi} = \frac{1 - s\frac{C1}{2 \cdot gm1} + s^2\left(\frac{C1 \cdot C2}{gm1 \cdot gm2}\right)}{1 + s\frac{C1}{2 \cdot gm1} + s^2\left(\frac{C1 \cdot C2}{gm1 \cdot gm2}\right)} = \frac{\omega1^2 - \frac{\omega1}{Q1}s + s^2}{\omega1^2 + \frac{\omega1}{Q1}s + s^2} \quad (2)$$

Here, ω1 is a parameter indicative of a characteristic angular frequency, and Q1 is a parameter indicative of steepness of the filter 151-1 at the characteristic angular frequency ω1. They are expressed by following equations (3) and (4).

$$\omega1^2 = \frac{gm1 \cdot gm2}{C1 \cdot C2} \quad (3)$$

$$Q1 = \frac{2C2}{gm2} \cdot \omega1 \quad (4)$$

Figure 4:
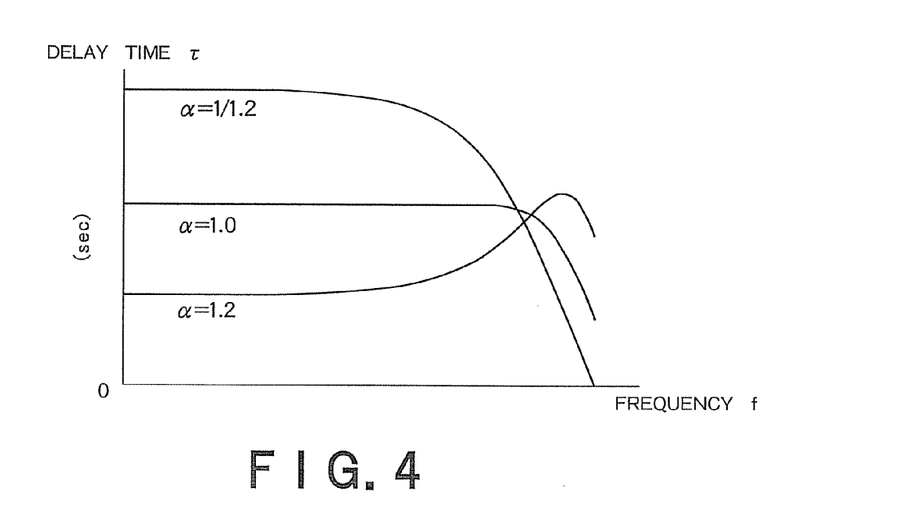
FIG. 4 is a graph showing an example of a frequency characteristic of a delay time τ of the filter 151-1 in the case of gm1*gm2=α (α=1/1.2, 1.0, and 1.2).

FIG. 4 is a graph showing an example of a frequency characteristic of a delay time τ of the filter 151-1 in the case of gm1*gm2=α (α=1/1.2, 1.0, and 1.2). The horizontal axis is the frequency, and the vertical axis is the delay time τ. Thus α is varied by controlling gm1 to gm3 by the signal Vf1 and Vf3 generated by the RF rate measuring and controlling circuit 28b, thereby controlling the characteristic angular frequency ω1 and the steepness Q1 expressed by the equations (3) and (4) dependent on the value of α. As a result, the delay time of the RF signal can be controlled dependent on the frequency. As described above, the delay time of the RF signal can be controlled dependent on the frequency by controlling the time constants of the filters 151-1 to 151-3 by the signal Vf1 to Vf3.

Figure 5:
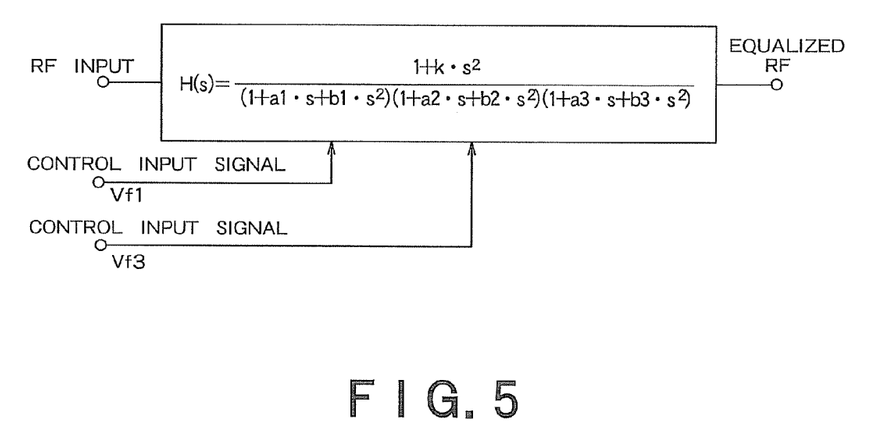
FIG. 5 is a graph showing a transfer function of the RF equalizer 15a of FIG. 2 having the filters 151-1 to 151-3 with the internal configuration of FIG. 3.
Figure 6:
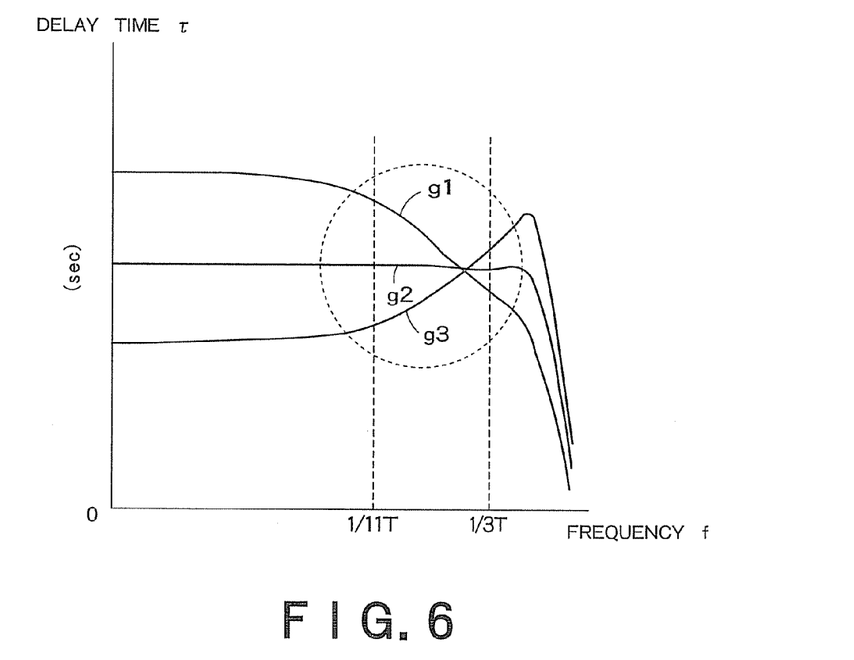
FIG. 6 is a graph showing an example of a frequency characteristic of the delay time τ of the RF equalizer 15a of FIG. 5.

FIG. 5 is a graph showing a transfer function of the RF equalizer 15a of FIG. 2 having the filters 151-1 to 151-3 with the internal configuration of FIG. 3. Parameters a1 to a3, b1 to b3, and k are constants determined by gains of the operation amplifiers in the filters 151-1 to 151-3 and the capacitances of the capacitors. FIG. 6 is a graph showing an example of a frequency characteristic of the delay time τ of the RF equalizer 15a of FIG. 5. The horizontal and vertical axes are the same as FIG. 4. In FIG. 6, each curve of the frequency characteristic controlled by the control input signals Vf1 to Vf3 is expressed as g1 to g3, respectively.

Here, as described above, the RF signal for the CD contains a signal component including plurality of channel frequencies of 3T to 11T as fundamental frequencies, while the RF signal of DVD contains that of 3T to 14T. Therefore, it is preferable that the filters 151-1 to 151-3 are designed so that the delay time can be controlled dependent on the frequency within these frequency bands.

More specifically, when the higher frequency component of the RF signal has longer delay time, the characteristic of the RF equalizer 15a is set so that the delay time of the RF signal becomes shorter as the frequency is higher, as the curve g1 of FIG. 6. When the delay time of the RF signal is substantially constant regardless of the frequency, the characteristic of the RF equalizer 15a is set so that the delay time does not vary at the wide frequency range, as the curve g2 of FIG. 6. When the higher frequency component of the RF signal has shorter delay time, the characteristic of the RF equalizer 15a is set so that the delay time of the RF signal becomes longer as the frequency is higher, as the curve g3 of FIG. 6. By such a manner, the waveform distortion of the RF signal due to the tangential tilt can be adjusted.

By performing above described processing, the waveform distortion of the RF signal which has passed the RF equalizer 15a is corrected. Therefore, an output signal of the RF equalizer 15a will be hereinafter called as an equalized RF signal.

Here, the configuration of the filter of FIGS. 2, 3 and 5 is only an example. The configuration of the RF equalizer 15a is not limited to these, and the internal configurations of the filters 151-1 to 151-3 can be modified variously. For example, when the order of the RF equalizer 15a is designed higher, the controllable range of the delay time can be widened. When the order of the RF equalizer 15a is designed lower, the circuit volume can be reduced. Furthermore, the internal configurations of the filters 151-1 to 151-3 are not necessarily the same. For example, the value of the capacitor C1 or the like can be varied for each of the filters 151-1 to 151-3.

Next, the internal configurations and operations of the multi slicing circuit 30a and the waveform distortion measuring circuit 30b will be explained. The multi slicing circuit 30a and the waveform distortion measuring circuit 30b has a waveform distortion detector. A slicing level Vsc (center level) of the second comparator 302 is generated by the integrating circuit 42 by integrating binarized data (reference binarized data) outputted from the second comparator 302. That is, the slicing level Vsc is generated by a feedback loop composed of the second comparator 302 and the integrating circuit 42. This feedback loop is composed based on a rule called DSV (Digital Sum Value) slice that the binarized data is modulated so that a time period of high level gets equal to that of low level averagely for a long time. The first slicing level Vsu is a level added by Vo (predetermined voltage) from the center level Vsc, and the third slicing level Vsd is a level subtracted by Vo from the center level Vsc.

Here, although the integrating circuit 42 is omitted in FIG. 1 for convenience, a practical configuration is shown in FIG. 2.

Figure 7A:
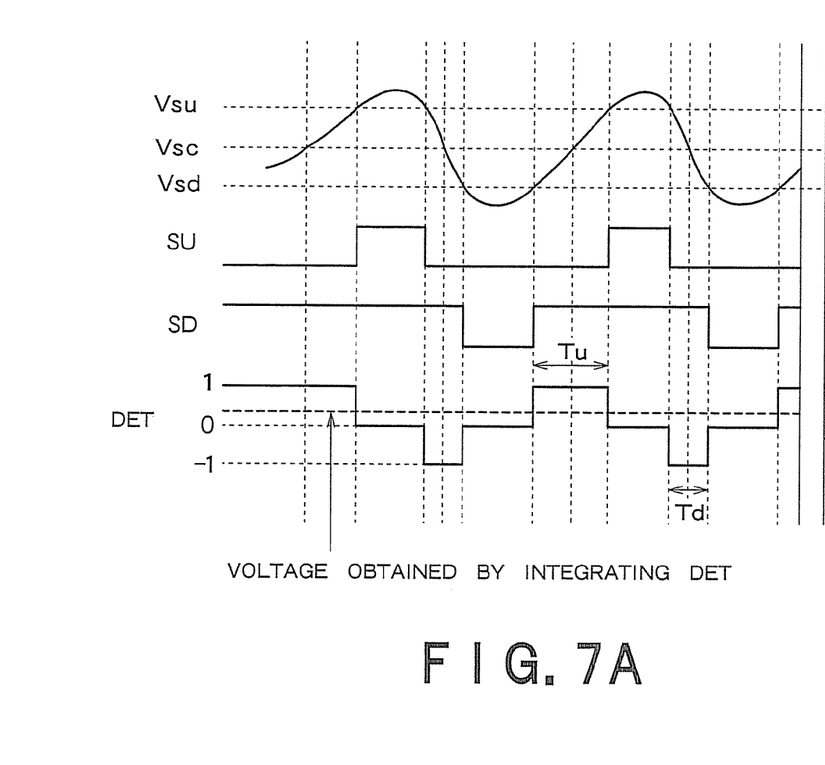
FIG. 7A and FIG. 7B are examples of operation waveforms of the multi slicing circuit 30a and the waveform distortion measuring circuit 30b.
Figure 7B:
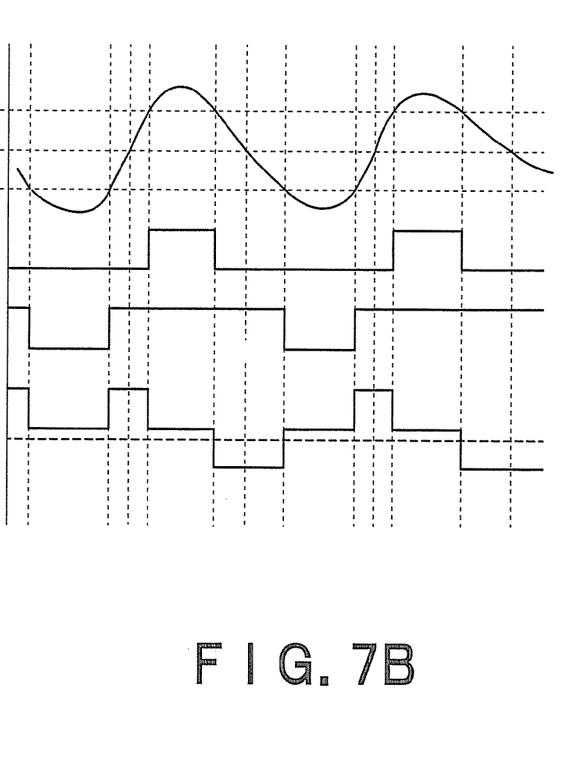

FIG. 7 is an example of an operation waveform of the multi slicing circuit 30a and the waveform distortion measuring circuit 30b. For simplification, FIG. 7 shows an example of a case where the RF signal contains a single frequency component. FIG. 7A shows an example of a case where the waveform is distorted backward of the time axis direction, while FIG. 7B shows an example of a case where the waveform is distorted forward of the time axis direction. In general, when the tangential tilt occurs, the waveform is distorted as FIG. 7A or FIG. 7B dependent on whether the beam irradiated by the pickup 12 shifts forward or backward of the rotation direction of the disk surface.

The first comparator 301 (high threshold comparator) and the third comparator 303 (low threshold comparator) compare the equalized RF signal that has passed the RF equalizer 15a with the slicing level Vsu and Vsd to generate binarized data SU (second binarized data) and SD (first binarized data), respectively. The first and the third comparator 301 and 303 also provide the waveform distortion measuring circuit 30b with these binarized data SU and SD. The second comparator 302 (reference comparator) compares the equalized RF signal with the slicing level Vsc to generate binarized data as well. The second comparator 302 also provides the demodulating circuit 31 with the binarized data as an information signal. The slicing level Vsc is an intermediate level between the slicing levels Vsu and Vsd.

As shown in FIG. 2, the waveform distortion measuring circuit 30b has a detecting circuit 304, an integrating circuit 305, and an A/D-converting circuit 306. The waveform distortion measuring circuit 30b detects the waveform distortion based on the binarized data SU and SD and provides the RF rate measuring and controlling circuit 28b with the detection result as described below. That is, as shown in FIG. 7, the detecting circuit 304 sets an output signal DET as "1" (first value) when the binarized data SD rises and sets the output signal DET as "0" (second value) when the binarized data SU rises. Furthermore, the detecting circuit 304 sets the output signal DET as "−1" (third value) when the binarized data SD falls and sets the output signal DET as "0" when the binarized data SU falls. Here, "1" corresponds to a supply voltage, "−1" to a ground voltage, and "0" to the intermediate voltage of these voltages, for example. Thus, the output signal DET of the detecting circuit 304 can be three values, comprising "1", "0", and "−1".

The integrating circuit 305 integrates the output signal DET of the detecting circuit 304. The A/D-converting circuit 306 converts the integrated voltage to a digital signal to generate a signal DISORTION (distortion detection signal) indicative of the distortion. For example, in the case of FIG. 7A, because a time period Tu when the output signal DET is "1" is longer than a time period Td when the output signal DET is "−1", the voltage obtained by integrating the signal DET (dashed line in FIG. 7A) is higher than the intermediate voltage. Therefore, the waveform distortion measuring circuit 30b can detect that the waveform with a frequency shown in the signal of FIG. 7A is distorted backward.

As described above, the integrating circuit 305 detects a positive and negative pulse width of the output signal DET of the detecting circuit 304, and the waveform distortion measuring circuit 30b detects the waveform distortion.

Although only, a single frequency is shown in FIG. 7, the RF signal practically contains a plurality of channel frequency components. Therefore, the waveform distortion measuring circuit 30b detects a delay time of average frequency of the equalized RF signal (e.g. about 5T for CD). Furthermore, when the delay time is longer, the difference between the voltage obtained by integrating the signal DET and the intermediate voltage, gets larger. Additionally, in the case where the waveform is distorted backward of the time axis direction (in this case, the voltage obtained by integrating the signal DET is higher than the intermediate voltage) as shown in FIG. 7A, as the frequency is higher, the delay time of the RF signal on the transmission path becomes longer. Contrarily, in the case where the waveform is distorted forward of the time axis direction (in this case, the voltage obtained by integrating the signal DET is lower than the intermediate voltage) as shown in FIG. 7B, as the frequency is higher, the delay time of the RF signal on the transmission path becomes shorter.

That is, the signal DISTORTION, which is obtained by A/D-converting the voltage obtained by integrating the signal DET, is a signal indicative of the delay time of the average frequency of the RF signal and the tendency of the delay characteristic for the frequency.

The above described operation of the waveform distortion measuring circuit 30b is only an example, and various modifications can be conceivable. For example, without A/D-converting the voltage outputted from the integrating circuit 305 obtained by integrating the output signal DET, the voltage as an analog signal can be used by the RF rate measuring and controlling circuit 28b. Furthermore, without using the integrating circuit 305, by measuring the time periods Tu and Td as digital signals using high frequency clock, and the waveform distortion can be detected from the difference between the measured Tu and Td.

Figure 8:
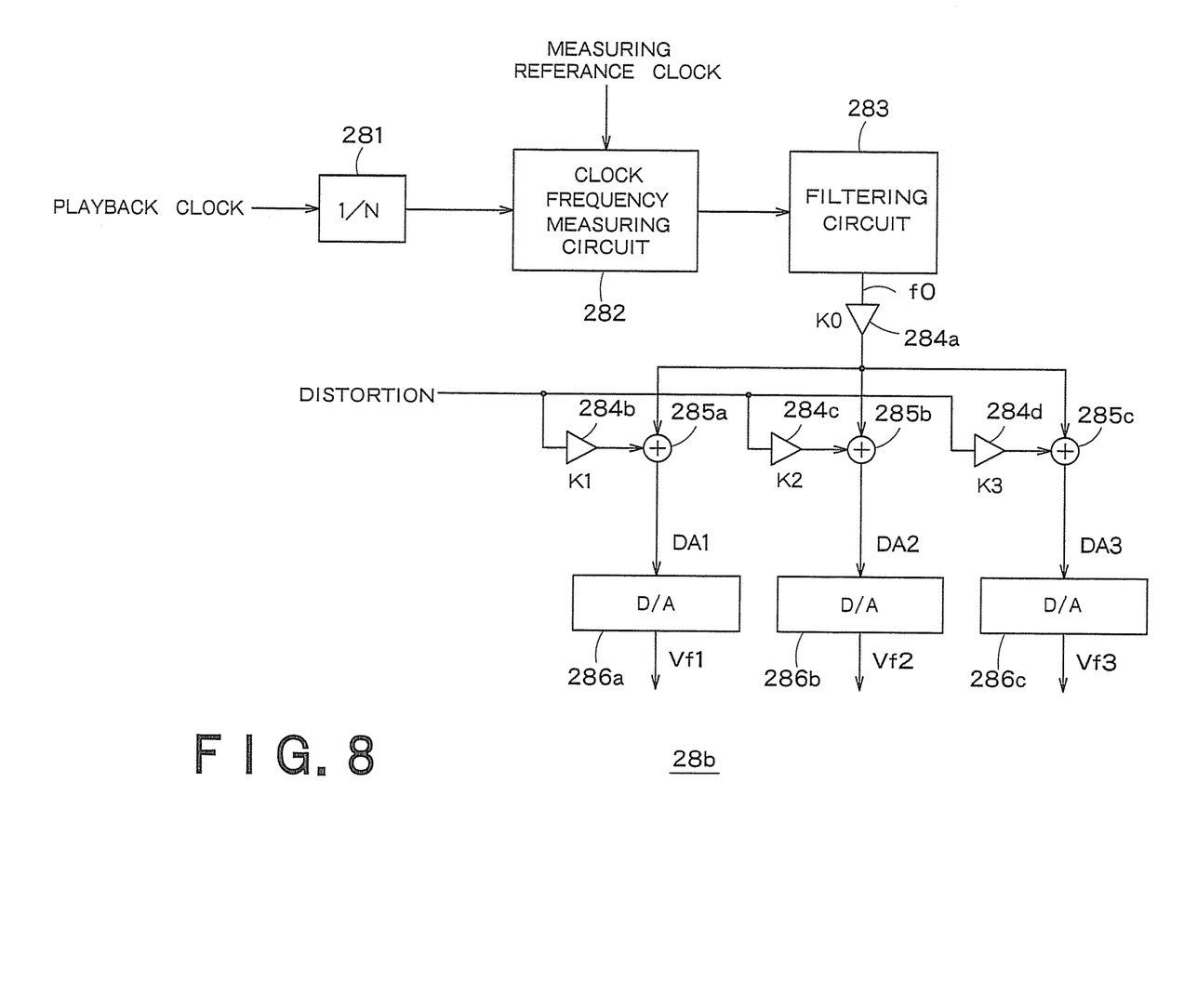
FIG. 8 is a block diagram showing an example of an internal configuration of the RF rate measuring and controlling circuit 28b.

Hereinafter, an internal configuration and operation of the RF rate measuring and controlling circuit 28b will be explained. FIG. 8 is a block diagram showing an example of the internal configuration of the RF rate measuring and controlling circuit 28b. The RF rate measuring and controlling circuit 28b controls the transfer characteristic of the RF equalizer 15a by variably controlling the time constants of the filters 151-1 to 151-3 in the RF equalizer 15a. The RF rate measuring and controlling circuit 28b is provided with the distortion detection signal DISTORTION, which is a digital signal from the waveform distortion measuring circuit 30b. The RF rate measuring and controlling circuit 28b has a 1/N dividing circuit 281 (divider), a clock frequency measuring circuit 282, a filtering circuit 283, multiplying circuits 284a to 284d, adding circuits 285a to 285c, and D/A-converting circuits 286a to 286c.

Figure 9:
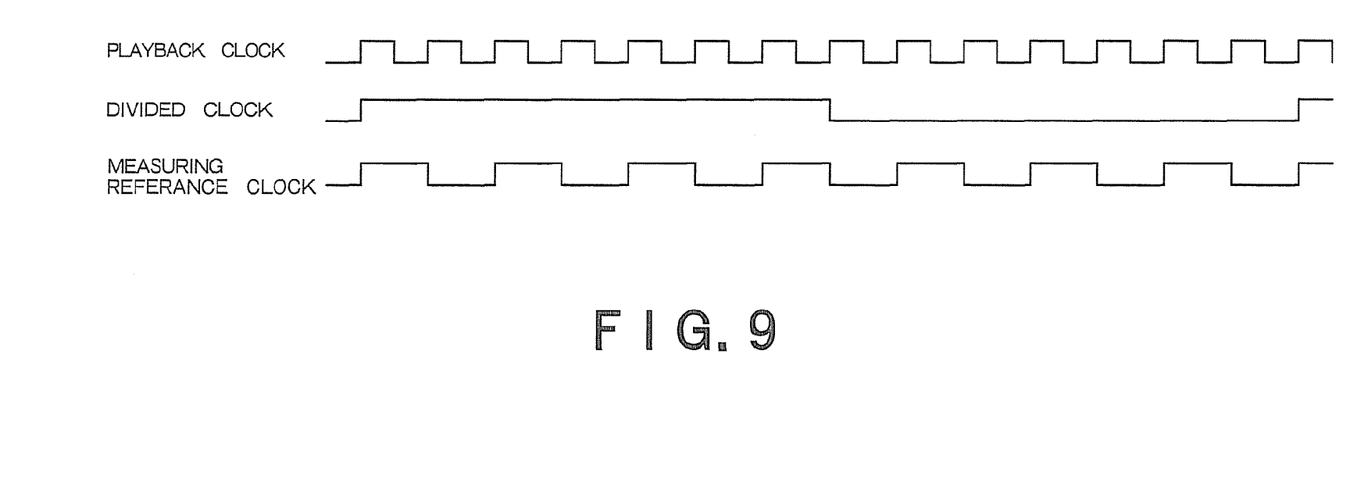
FIG. 9 is an example showing an operation of the RF rate measuring and controlling circuit 28b.

FIG. 9 is an example showing the operation of the RF rate measuring and controlling circuit 28b. The 1/N dividing circuit 281 generates a divided clock by frequency-dividing the playback clock generated by the playback clock PLL 28 by 1/N. The clock frequency measuring circuit 282 samples the frequency of the divided playback clock using a measuring reference clock with much higher frequency than that of the divided clock. This measuring reference clock may be generated in the optical disk driving device, or may be provided from the outside of the device.

In the example of FIG. 9, the 1/N dividing circuit 281 generates the divided clock as N=14. The clock frequency measuring circuit 282 detects that the frequency of the divided clock is 1/7 times that of the measuring reference clock by sampling the divided clock using the measuring reference clock. Because the value of N is known, the clock frequency measuring circuit 282 can measure that the frequency of the playback clock is 14/7=2 times that of the measuring reference clock. Practically, when the value of N is set large, the clock frequency measuring circuit 282 can measure the frequency of the playback signal even if the frequency of the measuring reference clock is not so high.

Here, the frequency of the playback clock corresponds to 1/T (T is a cycle of 1 channel bit) and varies dependent on the rotation speed of the optical disk 11. It is inevitable to measure the frequency of the playback clock in order to control the delay time dependent on the frequency of the RF signal as shown in FIG. 6.

The frequency data measured by the clock frequency measuring circuit 282 is inputted to the filtering circuit 283. The filtering circuit 283 eliminates the high frequency noise so that the measurement result does not vary too much. The frequency data f0 of the playback clock, which is a measurement result of the frequency, which has passed the filtering circuit 283 is multiplied by a control coefficient K0 (first coefficient) by the multiplying circuit 284a (first multiplying circuit).

Here, the 1/N dividing circuit 281, the clock frequency measuring circuit 282, the filtering circuit 283 and the multiplying circuit 284a, which are described above, perform digital signal processing. Each of the playback signal provided by the playback clock PLL 28, the measuring reference clock and the frequency data f0 of the playback clock is a digital signal.

On the other hand, the distortion detection signal DISTORTION outputted by the waveform distortion measuring circuit 30b is multiplied by a control coefficients K1 to K3 (second coefficient) by the multiplying circuits 284b to 284d (second multiplying circuit). The multiplied results are added to the output signal of the multiplying circuit 284a by the adding circuits 285a to 285c. And the added signals are converted to analog signals Vf1 to Vf3 by the D/A-converting circuits 286a to 286c. More specifically, the output signals DA1 to DA3 of the adding circuits 285a to 285c are expressed by the following equations (5) to (7).

$$DA1=K0*f0+K1*DISTORTION \quad (5)$$

$$DA2=K0*f0+K2*DISTORTION \quad (6)$$

$$DA3=K0*f0+K3*DISTORTION \quad (7)$$

The output signals DA1 to DA3 of the adding circuit 285a to 285c expressed by equations (5) to (7) are converted to the analog signals Vf1 to Vf3 by the D/A-converting circuits 286a to 286c, respectively.

The signals Vf1 to Vf3 are provided to the filters 151-1 to 151-3 in the RF equalizer 15a of FIG. 3 as control input signals to control the frequency characteristics of the filters 151-1 to 151-3.

The control coefficients K0 to K3 used by the multiplying circuits 284a to 284d are predetermined to a value suitable for a type of the pickup 12 so as to correct the frequency of the delay time of the RF signal caused by the tangential tilt. More specifically, when there is no waveform distortion of the equalized signal, the control coefficients K0 to K3 are set so that the transfer function of the RF equalizer 15a becomes the curve g2 of FIG. 6. When the waveform of the equalized RF signal is distorted backward of the time axis direction as shown in FIG. 7A, the control coefficients K0 to K3 are set so that the transfer function of the RF equalizer 15a becomes the curve g1 of FIG. 6 because the delay time of the RF signal on the transmission path becomes longer as the frequency is higher. The most suitable value of the coefficients K0 to K3 may be set depending on the result of experiment or simulation by varying the waveform of the RF signal.

Figure 10A:
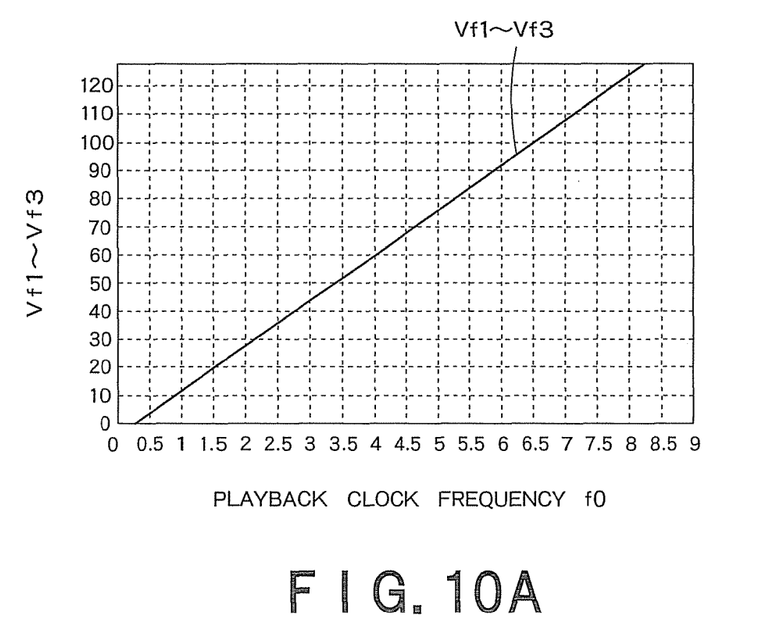
FIG. 10 is a characteristic showing an example of signals Vf1 to Vf3 versus a frequency of a playback clock.
Figure 10B:
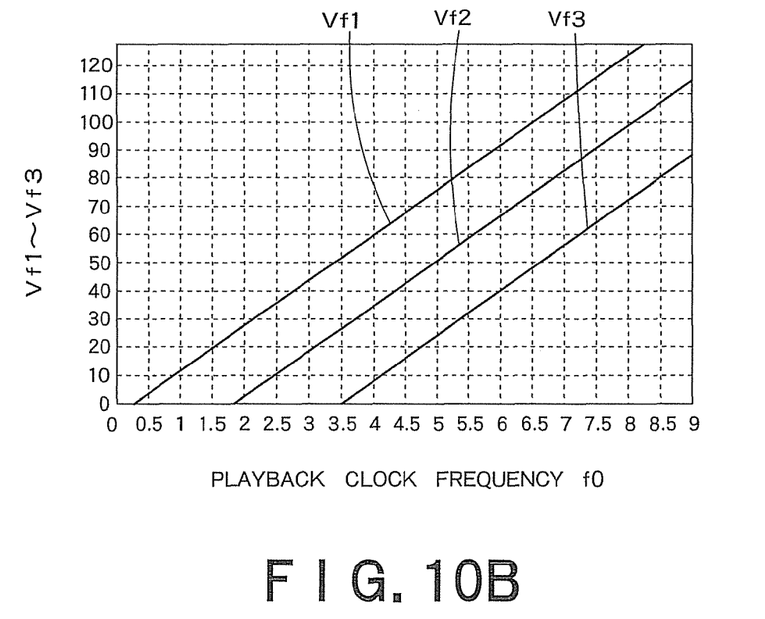

FIG. 10 is a characteristic showing an example of the signals Vf1 to Vf3 versus the frequency of the playback clock. The horizontal axis is frequency data f0 of the playback clock, and the horizontal axis is analog values of the signal Vf1 to Vf3. FIG. 10 shows an example of K1>K2>K3 and the relationship between the signal DISTORTION and the waveform distortion of the RF signal is assumed below. That is, the value of the signal DISTORTION is set to be 0 when there is no waveform distortion in the equalized RF signal, and the sign of the signal DISTORTION is set to be negative when the waveform is distorted forward of the time axis direction of FIG. 7A.

FIG. 10A shows a case where there is no waveform distortion in the equalized RF signal. Because DISTORTION=0 in the above equations (5) to (7), Vf1=Vf2=Vf3. The values of the signals Vf1 to Vf3 vary dependent on the frequency data f0 lineally, and the frequency characteristic of the gain of the RF equalizer 15a is controlled dependent on the signals Vf1 to Vf3.

On the other hand, FIG. 10B shows a case where the waveform distortion is present in the equalized RF signal. The signals Vf1 to Vf3, each of which has different values, are generated dependent on the value of the signal DISTOR- TION. As a result, the frequency characteristic of not only the gain but the delay time of the RF equalizer 15a is controlled, thereby obtaining the transfer characteristic that the delay time is different dependent on the frequency as shown in FIG. 6. Because this characteristic is opposite to that of the frequency characteristic of the delay time on the transmission path of the RF signal, the frequency characteristic of the delay time of the RF signal, in other words, the waveform distortion, can be corrected.

Here, FIG. 10 is an example to simply explain the operation of the RF rate measuring and controlling circuit 28b. The relationship between the signal DISTORTION and the waveform distortion of the RF signal and/or the control coefficients K0 to K3 are determined dependent on the configurations of the filters 151-1 to 151-3 etc.

An example has been explained where only the signals Vf1 and Vf3 are used in order to control the frequency characteristic of the RF equalizer 15a which has the second-order filters 151-1 to 151-3 in FIG. 2 or the like. The signal Vf2 can be used as well according to the configurations of the filters 151-1 to 151-3, for example, in the case where they are odd-order. An example has been explained in FIG. 8 where conversion to the analog signal is performed after digital processing is performed. However, the RF rate measuring and controlling circuit 28b can also output analog signals. In this case, the RF rate measuring and controlling circuit 28b performs only analog operation, thereby simplifying the circuit configuration.

As described above, according to the first embodiment, the multi slicing circuit 30a and the RF rate measuring and controlling circuit 28b detect the waveform distortion of the equalized RF signal. In order to correct the waveform distortion of the RF signal, the RF rate measuring and controlling circuit 28b generates the control input signals Vf1 to Vf3, and the frequency characteristic of the delay time of the filters 151-1 to 151-3 in the RF equalizer 15a is controlled by the control input signals Vf1 to Vf3. Therefore, even if the waveform distortion in the RF signal is caused by the tangential tilt, the waveform distortion can be corrected accurately. As a result, the margin of the pickup is not necessarily set to be extremely small so as the tangential tilt does not occur, thereby increasing the manufacturing yield of the pickup.

Second Embodiment

In the first embodiment, the multi slicing circuit 30a and the RF rate measuring and controlling circuit 28b detect the waveform distortion of the equalized RF signal, and the RF rate measuring and controlling circuit 28b controls the filters 151-1 to 151-3 in the RF equalizer 15a dependent on the detected distortion. In a second embodiment, which will be described below, the system controller 38 controls the filter 151-1 to 151-3 without detecting the waveform distortion of the RF signal.

Figure 11:
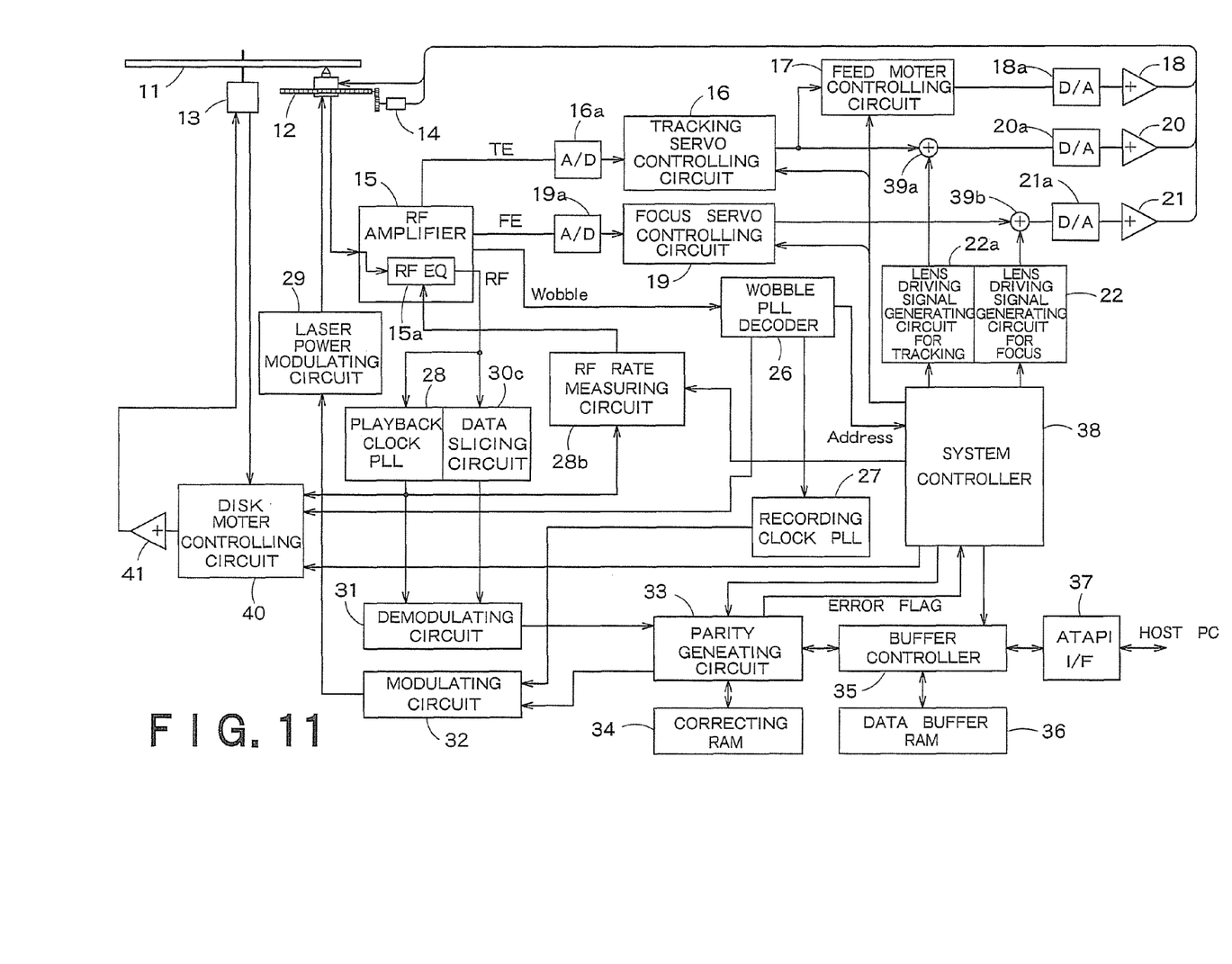
FIG. 11 is a block diagram showing a schematic configuration of an optical disk drive device according to a second embodiment of the present invention.

FIG. 11 is a block diagram showing a schematic configuration of an optical disk drive device according to the second embodiment of the present invention. In FIG. 11, parts common to those of FIG. 1 have common reference numerals, respectively. Hereinafter, different parts from FIG. 1 will be mainly described. The optical disk drive device has a data slicing circuit 30c instead of the multi slicing circuit 30a. The data slicing circuit 30c binarizes the equalized RF signal and provides its binarized data to the demodulating circuit 31 as an information signal. The data slicing circuit 30c can be composed of a comparator (not shown) because the data slicing circuit 30c does not detect the waveform distortion of the equalized RF signal different from the multi slicing circuit 30a. Furthermore, the waveform distortion measuring circuit is unnecessary in FIG. 11.

The internal configuration of the RF rate measuring and controlling circuit 28b is the same as that of FIG. 8. However, the RF rate measuring and controlling circuit 28b is provided with a digital distortion control signal from the system controller 38, instead of the signal DISTORTION.

The RF rate measuring and controlling circuit 28b measures the frequency of the playback clock like the first embodiment. The system controller 38 has a plurality of predetermined coefficients for controlling the filters 151-1 to 151-3 and provides the RF rate measuring and controlling circuit 28b with one of them as the distortion control signal. The RF rate measuring and controlling circuit 28b of FIG. 8 generates the control input signals Vf1 to Vf3 inputted to the filters 151-1 to 151-3 based on the measurement result of the frequency of the playback clock and the distortion control signal provided by the system controller 38. Therefore, the transfer characteristic of the RF equalizer 15a can be controlled so that the delay time is adjusted dependent on the frequency as shown in FIG. 6.

On the other hand, the system controller 38 constantly acquires an error flag generated by the data correcting and parity generating circuit 33. When errors are present in the playback data, the data correcting and parity generating circuit 33 generates the error flag when performing the correcting process. As there are more errors, the error flags are generated more frequently. The system controller 38 monitors the error flag and changes the coefficients by turns to update the distortion control signal provided to the RF rate measuring and controlling circuit 28b. The system controller 38 finally selects the best coefficient which reduces the frequency of the error.

As described above, according to the second embodiment, the system controller 38 controls the filters 151-1 to 151-3 without detecting the waveform distortion of the RF signal. Therefore, the multi slicing circuit 30a and the waveform distortion measuring circuit 30b are unnecessary, and the circuit volume can be reduced. Furthermore, the waveform of the RF signal can be corrected even if the waveform distortion of the RF signal can not be detected. In addition, because the system controller 38 monitors the error flag, the best coefficient which reduces the frequency of the error can be selected to control the transfer characteristic of the filters 151-1 to 151-3.

As a modification example of the present embodiment, the optical disk drive device of FIG. 11 can have the multi slicing circuit 30a and the waveform distortion measuring circuit 30b like that of FIG. 1. In this example, when the waveform distortion measuring circuit 30b can detect the waveform distortion of the RF signal, the filters 151-1 to 151-3 are controlled dependent on the detected waveform distortion as well as the first embodiment. When the waveform distortion measuring circuit 30b cannot detect the waveform distortion of the RF signal, for example, when there are a lot of jitters, the system controller 38 controls the filters 151-1 to 151-3 in a manner of the present embodiment.

Although in the above described embodiments, examples of driving CD and DVD have been explained, the present invention can be applied to other optical disks such as HD (High Definition) DVD and BD (Blu-ray Disk).

The configurations capable of performing both record and playback are explained in FIG. 1 and FIG. 11. However, the present invention is applicable to an optical disk drive device for only playback because there are cases where only the playback of the optical disk is required.

Although based on above description, those skilled in the art can figure out additional effects and variations of the present invention, the aspect of the present invention is not limited to the stated each embodiments. Various additions, alterations and partial deletions can be done to the present invention within the conceptualistic thought and purpose of the present invention drawn on the claims and the equivalents.

The invention claimed is:

1. An optical disk drive device comprising:
   an RF equalizer configured to generate an analog equalized RF signal by controlling a frequency characteristic of a delay time of an analog RF signal read out from an optical disk based on a control input signal;
   a playback clock extractor configured to extract a playback clock for reproducing data recorded on the optical disk from the analog equalized RF signal; and
   an RF rate controller configured to generate the control input signal inputted to the RF equalizer,
   wherein the control input signal is a signal for correcting waveform distortion of the RF signal by controlling the delay time of the RF signal dependent on a frequency of the playback clock.

2. The device of claim 1, wherein the RF equalizer generates the equalized RF signal by controlling the delay time of the RF signal to be shorter as the frequency of the RF signal is higher when the read out RF signal has a characteristic that the delay time becomes longer as the frequency is higher, and generates the equalized RF signal by controlling the delay time of the RF signal to be longer as the frequency of the RF signal is higher when the read out RF signal has a characteristic that the delay time becomes shorter as the frequency is higher.

3. The device of claim 1, wherein the playback clock is a clock whose frequency varies dependent on a rotation speed of the optical disk,
   the RF rate controller measures the frequency of the playback clock based on the result of sampling a frequency-divided clock using a measuring reference clock having a known frequency, the frequency-divided clock being obtained by frequency-dividing the playback clock.

4. The device of claim 1, wherein the RF rate controller generates the control input signal including a first control signal and a second control signal,
   the RF equalizer comprises a plurality of filters connected in series,
   each of the plurality of filters comprises:
   a first differential amplifier configured to generate a first signal obtained by gain-controlling a difference signal between an input signal and an output signal by a first gain controlled by the first control signal;
   a second differential amplifier configured to generate a second signal obtained by gain-controlling a difference signal between the first signal and the output signal by a second gain controlled by the second control signal;
   a third differential amplifier configured to generate a third signal obtained by gain-controlling a difference signal between the output signal and the input signal by a third gain controlled by the second control signal;
   a first capacitor connected between an output terminal of the first differential amplifier and a reference voltage terminal; and
   a second capacitor connected between an output terminal of the second differential amplifier and a input terminal of the first differential amplifier;
   wherein the output terminal of the second differential amplifier and an output terminal of the third differential amplifier are short-circuited.

5. The device of claim 1, further comprising:
   a waveform distortion detector configured to detect waveform distortion of the equalized RF signal to provide the RF rate controller with a distortion detection signal indicative of the detection result,
   wherein the RF rate controller generates the control input signal based on the frequency of the playback clock and the distortion detection signal.

6. The device of claim 5, further comprising;
   a low threshold comparator configured to binarize the equalized RF signal by using a first voltage as a threshold value to generate first binarized data; and
   a high threshold comparator configured to binarize the equalized RF signal by using a second voltage higher than the first voltage as a threshold value to generate second binarized data,
   wherein the waveform distortion detector detects the waveform distortion of the RF equalizer based on the first and the second binarized data.

7. The device of claim 6, further comprising;
   a reference comparator configured to binarize the equalized RF signal by using a reference voltage as a threshold value to generate reference binarized data; and
   an integrator configured to generate the reference voltage by integrating the reference binarized data,
   wherein the low threshold comparator generates the first binarized data by using a predetermined voltage lower than the reference voltage as the first voltage, and
   the high threshold comparator generates the second binarized data by using the predetermined voltage higher than the reference voltage as the second voltage.

8. The device of claim 6, wherein the waveform distortion detector comprises:
   a detector configured to set an output signal to be a first value when the first binarized data rises, set the output signal to be a second value when the second binarized data rises, set the output signal to be a third value when the second binarized data falls, and set the output signal to be the second value when the first binarized data falls; and
   an integrator configured to integrate the output signal,
   wherein the waveform distortion detector detects the waveform distortion of the equalized RF signal by comparing the integration result with the second value.

9. The device of claim 8, wherein the waveform distortion detector determines that the waveform of the equalized RF signal is distorted backward of a time axis direction when the integration result is larger than the second value and determines that the waveform of the equalized RF signal is distorted forward of the time axis direction when the integration result is smaller than the second value.

10. The device of claim 9, wherein the RF equalizer generates the equalized RF signal by controlling the delay time to be shorter as the frequency of the RF signal is higher, when the waveform distortion detector determines that the waveform of the equalized RF signal is distorted backward of the time axis direction, and
   the RF equalizer generates the equalized RF signal by controlling the delay time to be longer as the frequency of the RF signal is higher, when the waveform distortion detector determines that the waveform of the equalized RF signal is distorted forward of the time axis direction.

11. The device of claim 5, wherein the RF rate controller comprising:
   a divider configured to generate a frequency-divided clock by frequency-dividing the playback clock;

a clock frequency measurer configured to measure the frequency of the playback clock based on the frequency-divided clock and a measuring reference clock having a higher frequency than that of the frequency-divided clock; and an adder configured to generate the control input signal by combining the distortion detection signal and the measurement result of the frequency of the playback clock measured by the clock frequency measurer.

12. The device of claim 11, wherein the adder comprises:

a first multiplying circuit configured to multiply the measurement result of the frequency of the playback clock by a first coefficient;

a second multiplying circuit configured to multiply the distortion detection signal by a second coefficient; and an adding circuit configured to add an output result of the first multiplying circuit to an output result of the second multiplying circuit to generate a signal corresponding to the control input signal.

13. The device of claim 12, wherein the first and the second coefficients are set dependent on a type of a pickup used to read out the optical disk to correct the waveform distortion of the RF signal by the RF equalizer.

14. The device of claim 1, further comprising a coefficient controller configured to select one of a plurality of predetermined coefficients to provide its selected one to the RF rate controller, wherein the RF rate controller generates the control input signal based on the measurement result of the frequency of the playback clock and the coefficient provided by the coefficient controller.

15. The device of claim 14, further comprising:

a demodulator configured to conduct demodulating process based on the equalized RF signal; and an error corrector configured to perform error correction based on data demodulated by the demodulator, wherein the coefficient controller changes the coefficients by turns and finally selects one coefficient optimizing the result of the error correction according to the detection result of the error correction.

16. The device of claim 14, further comprising:

a waveform distortion detector configured to detect waveform distortion of the equalized RF signal to provide the RF rate controller with a distortion detection signal indicative of the detection result, wherein the RF rate controller generates the control input signal based on the frequency of the playback clock and the distortion detection signal when the waveform distortion detector is capable of detecting the waveform distortion of the equalized RF signal, and the RF rate controller generates the control input signal based on the frequency of the playback clock and the coefficient provided by the coefficient controller when the waveform distortion detector is not capable of detecting the waveform distortion of the equalized RF signal.

17. An optical disk drive method comprising:

generating an analog equalized RF signal by controlling a frequency characteristic of a delay time of an analog RF signal read out from an optical disk based on a control input signal;

extracting a playback clock for reproducing data recorded on the optical disk from the analog equalized RF signal; and generating the control input signal, wherein the control input signal is a signal for reducing waveform distortion included in the RF signal by controlling the delay time of the RF signal dependent on a frequency of the playback clock.

18. The method of claim 17, further comprising:

detecting waveform distortion of the RF signal to provide the RF rate controller with a distortion detection signal indicative of the detection result, wherein upon generating the control, input signal, the control input signal is generated based on the frequency of the playback clock and the distortion detection signal.

19. The method of claim 17, further comprising:

selecting one of a plurality of predetermined coefficients, wherein upon generating the control input signal, the control input signal is generated based on the measurement result of frequency of the playback clock and the selected coefficient.

20. The method of claim 19, further comprising:

conducting demodulating process based on the equalized RF signal; and performing error correction based on the demodulated data, wherein upon selecting the coefficient, the coefficients are changed by turns and finally one coefficient optimizing the result of the error correction is selected according to the detection result of the error correction.

\* \* \* \* \*